June 2, 1953 — W. J. HABGOOD — 2,640,676
VALVE

Filed Aug. 2, 1951 — 2 Sheets-Sheet 1

INVENTOR.
Warren J. Habgood
BY
Caesar and Rivise
Attorneys

June 2, 1953 W. J. HABGOOD 2,640,676
VALVE

Filed Aug. 2, 1951 2 Sheets-Sheet 2

INVENTOR.
Warren J. Habgood
BY
Caesar and Rivise
Attorneys.

Patented June 2, 1953

2,640,676

UNITED STATES PATENT OFFICE 2,640,676

VALVE

Warren J. Habgood, Millbourne, Pa.

Application August 2, 1951, Serial No. 239,873

4 Claims. (Cl. 251—112)

This invention relates to a valve and more particularly to a sanitary type valve.

The use of a so-called "sanitary" valve or one which may be easily cleaned has been found essential, especially when employed for food processing. This invention provides a sanitary valve which utilizes permanent magnets to retain its assembled position. One permanent magnet is retained by the casing of the valve while the other permanent magnet is located in the valve control member adjacent to the first permanent magnet. This arrangement allows the control member to be freely rotated about its axis while maintaining its proper positional relationship with the valve casing. Thus, the invention provides a valve which may easily be disassembled and avoids the use of securing means which might not readily be adapted for cleaning purposes.

Therefore a principal object of this invention is to provide a new and improved valve which may be easily and quickly assembled and disassembled for cleaning purposes.

A further object of this invention is to provide a new and improved valve minimizing contamination of matter passing therethrough.

Yet a further object of the invention is to provide a new and improved valve minimizing the leakage of substances passing therethrough.

Still a further object of the invention is to provide a new and improved valve minimizing the entrapment and stagnating of substance flowing therethrough.

Another object of this invention is to provide a new and improved valve having smooth and regular internal cavities which may be easily cleaned.

Yet another object of the invention is to provide a new and improved valve having a minimum number of assembled parts.

Still another object of this invention is to provide a valve having new and improved means for maintaining an assembled relationship between its parts.

A further object of this invention is to provide a new and improved valve especially adaptable for use in food processing, mixing and conveying.

Yet a further object of this invention is to provide a new and improved valve, which is inexpensive to construct and maintain, simple to operate and readily manufactured on a mass scale.

The foregoing and other objects of the invention will become more apparent as the following detailed description of the invention is read in conjunction with the drawings, in which.

Like reference numerals designate like parts throughout the several views.

Figure 1:
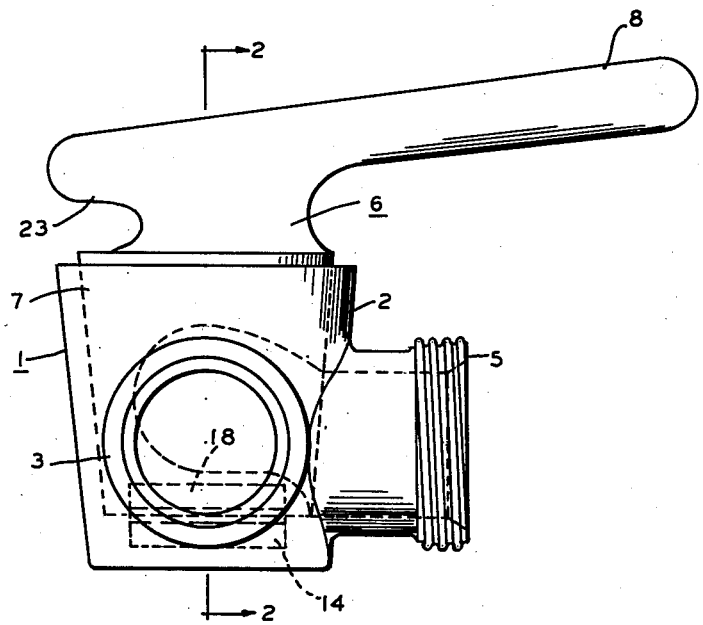
Figure 1 is a side elevational view of the valve embodying the invention.

Referring now to Figures 1 to 4, inclusive, the valve casing 1, which may be made from a stainless steel casting, is provided with a central section 2, and fluid inlet-outlet extensions 3, 4 and 5. The inlet-outlet extensions 3, 4 and 5 are hollow and tubular in configuration, having their externally opening extremities threaded for engaging a coupling device for delivering to or receiving materials from the valve.

The central portion 2 of the valve casing 1 is adapted to receive the control member 6. The valve control member 6 comprises a portion which is a frustum of a cone 7 and a turning means or handle 8. The valve controlling member 6 may be a one piece casting and preferably made of stainless steel.

When the valve is in its assembled position the frustum portion 7 of the valve control member 6 is received within the casing 1 with the plane surface of the converging extremity of the frustum 7 lying adjacent the bottom internal wall 10 of the central portion 2 of the valve casing 1. The converging side walls 11 are received by the inside vertical surfaces 12 of the central portion 2 of the valve casing 1.

A high precision fit is desirable between the surfaces of the frustum 7 and the contacting internal walls 9 and 12 of the central portion 2. This may be obtained by lapping these surfaces with the aid of a fine grinding compound. Under these circumstances, the closely fitting surfaces prevent leakage of material and also prevent material from lodging between these surfaces and stagnating. This avoids the contamination by such stagnating matter of substances passing through the valve; also makes easier maintaining the valve clean and sanitary; and allows easy rotation of the frustum 7 about its axis by means of the handle 8. The importance of this rotation will be seen when the operation of the valve is discussed.

It is noted here that the converging walls of the frustum 7 aid in properly receiving this element within the central portion 2 of the valve casing 1 especially when the surfaces 9, 10, 11 and 12 are concurrently lapped.

Figure 2:
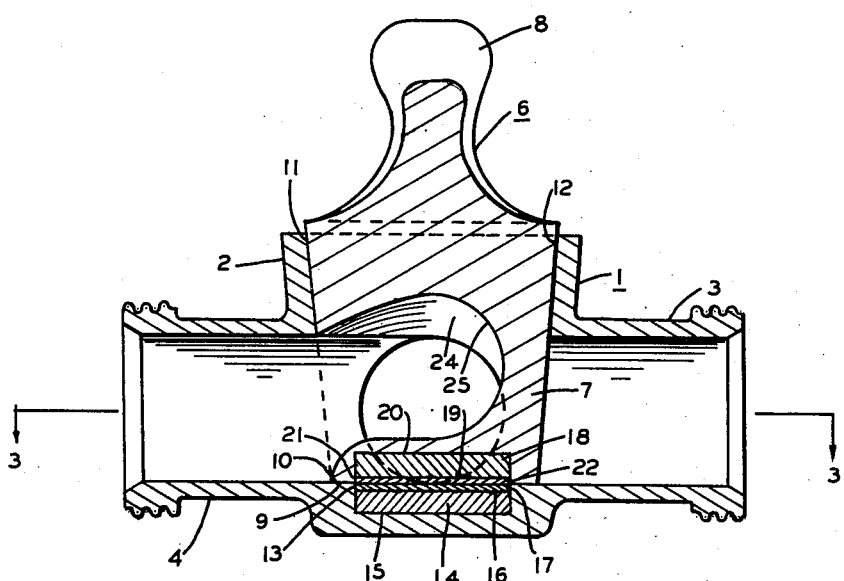
Figure 2 is a sectional view through the line 2—2 of Figure 1.

Referring to the figures, and especially Figure 2 it is noted that the internal bottom wall 10 of the central section 2 of the valve casing 1 has an opening 13 which receives a permanent magnet 14. Magnet 14 is circular in form and has complementary polarized faces 15 and 16. An insert or covering plate 17 which may be of stainless steel material encloses and seals the permanent magnet 14. A good seal may be obtained by welding the edge of the plate 17 to the edge of the opening 13. This bottom surface may then be finished or smoothed before the surfaces 9 and 10 are lapped, which lapping process was previously discussed.

A permanent magnet 18 of circular form having complementary polarized faces 19 and 20 is also retained within an opening 21 in surface 9 of the frustum 7. A cover plate 22 which also may be made of stainless steel likewise serves the purpose of enclosing and sealing the opening 21. The plate 22 may also be welded into position and then processed to present a plane surface.

It is noted that the elimination of depressions or irregularities in the internal surfaces of the valve avoids the retention therein of matter, solid or fluid, which in time becomes adulterated and contaminates food and other materials passing through the valve.

The faces 16 and 19 respectively of the permanent magnets 14 and 18 are complementary so that an attractive force exists between them. The present structure provides a force exerted between the permanent magnets which maintains the valve control member 6 properly positioned within the central portion 2 of the valve casing 1. The control member 6 may easily be removed from the casing 1 for cleaning or other purpose by exerting an upward axial force on the control member 6. This may be effected by placing an instrument under the nose 23 of the handle 8 bearing upon the central portion 2 of the valve casing.

Referring to the frustum 7 of the control member a cavity or fluid control channel 24 is provided therein. The inside surface 25 of the cavity 24 is curved to minimize disturbed fluid flow and to prevent any surface irregularities which might hamper its sanitation.

Figure 3:
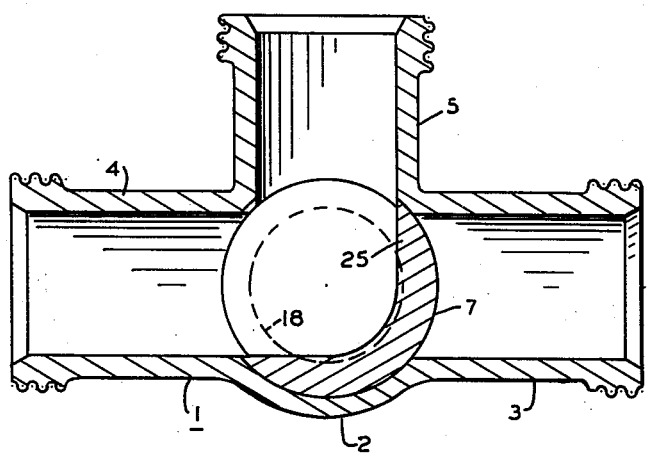
Figure 3 is a sectional view through the line 3—3 of Figure 2.
Figure 4:
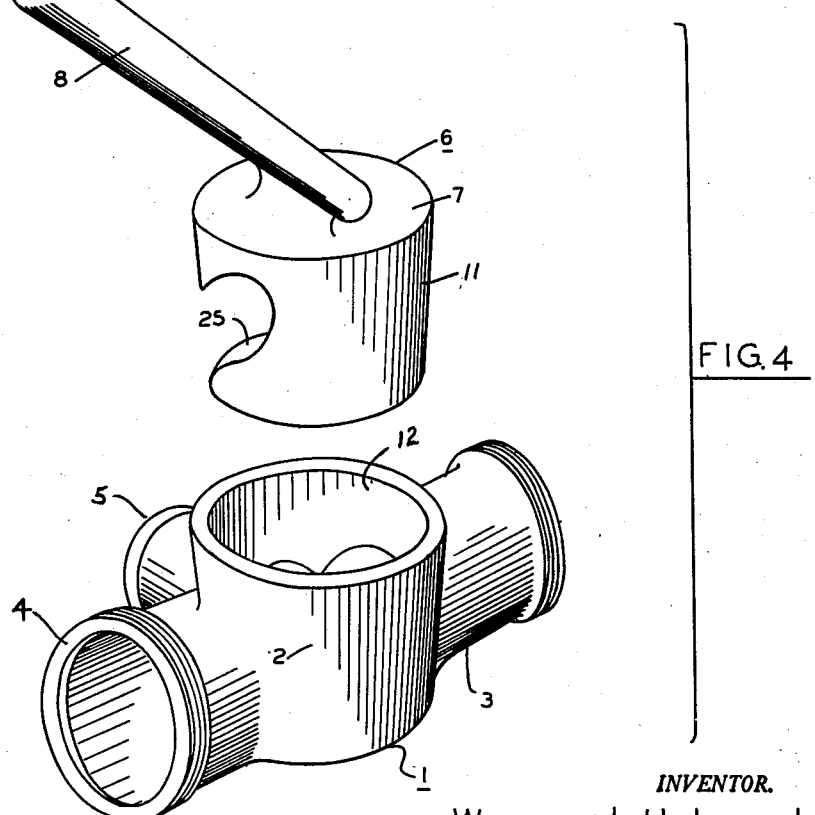
Figure 4 is a perspective view of the valve showing the control member removed from the valve casing.

Control of fluid flow may be obtained by axially revolving frustum 7 by using the handle 8 of the fluid control member 6. Referring to Figure 3 which is a cross-sectional view with the control member positioned as shown in Figures 1 and 2 with the handle 8 over the inlet-outlet extension 5, the internal cavities of the inlet-outlet extensions 4 and 5 communicate with each other through the cavity 24 of the control member 6.

When the handle 8 is turned 90 degrees clockwise from that shown in Figure 3 the cavities of extensions 3 and 5 communicate with each other. If the handle is turned further 90 degrees the hollow portions of the extensions 3, 4 and 5 are isolated from each other, shutting off the valve.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In a sanitary fluid valve device, an elongated casing having an imperforate bottom wall, a fluid control member extending into said casing and rotatable about an axis perpendicular to the path of fluid flow through said casing, said control member including a bottom wall superposed on a portion of the inner face of said bottom wall of said casing, and magnetic means acting between the bottom walls of said casing and said control member whereby said control member is retained in said casing primarily by magnetic attraction.

2. In a sanitary fluid valve device, an elongated casing having an imperforate bottom wall, a frusto-conical fluid control member extending into said casing and rotatable about an axis perpendicular to the path of fluid flow through said casing, said control member including a bottom wall superposed on a portion of the inner face of said bottom wall of said casing, and magnetic means acting between the bottom walls of said casing and said control member whereby said control member is retained in said casing primarily by magnetic attraction.

3. In a sanitary fluid valve device, an elongated casing having an imperforate bottom wall, a fluid control member extending into said casing and rotatable about an axis perpendicular to the path of fluid flow through said casing, said control member including a bottom wall superposed on a portion of the inner face of said bottom wall of said casing, and magnets retained in said control member and casing having faces of opposite polarity acting between the bottom walls of said casing and said control member to retain said control member in said casing primarily by magnetic attraction between said magnets.

4. In a sanitary fluid valve device, an elongated casing having an imperforate bottom wall, a fluid control member extending into said casing and rotatable about an axis perpendicular to the path of fluid flow through said casing, said control member including a bottom wall superposed on a portion of the inner face of said bottom wall of said casing a first magnet retained in said control member and a cover plate therefor lying flush with said bottom wall of said control member, and a second magnet polarized oppositely to said first magnet retained in said bottom wall of said casing and a cover plate for said second magnet lying flush with the inner face of said bottom wall of said casing whereby said control member is retained in said casing primarily by magnetic attraction between said first and second magnets.

WARREN J. HABGOOD.

References Cited in the file of this patent
UNITED STATES PATENTS

| Number | Name | Date |
|---|---|---|
| 407,495 | Shaw | July 23, 1889 |
| 1,319,787 | Moran | Oct. 28, 1919 |
| 2,503,043 | Gruen | Apr. 4, 1950 |
| 2,556,225 | Serge | June 12, 1951 |
| 2,586,453 | Bradbury | Feb. 19, 1952 |